(12) United States Patent
Sampas et al.

(10) Patent No.: US 10,518,241 B2
(45) Date of Patent: Dec. 31, 2019

(54) CREATING AND HARVESTING SURFACE-BOUND EMULSION

(71) Applicant: Agilent Technologies, Inc., Loveland, CA (US)

(72) Inventors: Nicholas M. Sampas, San Jose, CA (US); Richard P. Tella, Sunnyvale, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 567 days.

(21) Appl. No.: 14/684,028

(22) Filed: Apr. 10, 2015

(65) Prior Publication Data

US 2015/0290613 A1    Oct. 15, 2015

Related U.S. Application Data

(60) Provisional application No. 61/979,711, filed on Apr. 15, 2014.

(51) Int. Cl.
*B01J 19/00*    (2006.01)

(52) U.S. Cl.
CPC .. *B01J 19/0046* (2013.01); *B01J 2219/00596* (2013.01); *B01J 2219/00722* (2013.01)

(58) Field of Classification Search
None
See application file for complete search history.

(56) References Cited

U.S. PATENT DOCUMENTS

| 5,449,754 A | 9/1995 | Nishioka |
| 2003/0194709 A1 * | 10/2003 | Yang .............. B01J 19/0046 506/43 |
| 2007/0003442 A1 | 1/2007 | Link et al. |
| 2012/0035063 A1 * | 2/2012 | Kim .............. B01L 3/5088 506/7 |
| 2013/0296192 A1 | 11/2013 | Jacobson et al. |

FOREIGN PATENT DOCUMENTS

| CN | 103180729 A | 6/2013 |
| WO | WO2011056872 | 5/2011 |
| WO | 2012024574 A2 | 2/2012 |
| WO | WO2012064975 A1 * | 5/2012 |
| WO | WO2013123125 | 8/2013 |
| WO | WO2013163246 | 10/2013 |
| WO | WO2014028537 | * 2/2014 |

OTHER PUBLICATIONS

Cleary et al. ( Nature Methods 1.3 (2004): 241-248).*

* cited by examiner

*Primary Examiner* — Tracy Vivlemore
*Assistant Examiner* — Sahana S Kaup

(57) ABSTRACT

Provided is an emulsion comprising: (a) droplets that contain a single polymeric compound or a pre-defined mixture thereof, and (b) an immiscible liquid, wherein: (i) each of the droplets comprises multiple molecules of the compound(s) contained therein; and the droplets do not contain monomeric precursors for the polymeric compound. A method for making the emulsion is also provided.

12 Claims, 9 Drawing Sheets a. A Triangular Droplet Cluster Pattern b. A Diamond Droplet Cluster Pattern c. A Hexagonal (or Honeycomb) Droplet Cluster Pattern

CREATING AND HARVESTING SURFACE-BOUND EMULSION

CROSS-REFERENCING

This application claims the benefit of provisional application Ser. No. 61/979,711, filed Apr. 15, 2014, which application is incorporated by reference herein for all purposes.

BACKGROUND

For some multiplex biological and genomic applications, it is useful to combine reagents and/or biological samples in compartmentalized reactions to perform complex assays separate from other reactions or at high concentrations with minute sample volumes.

SUMMARY

Described herein is an emulsion comprising: (a) droplets that contain a single polymeric compound or a pre-defined mixture thereof, and (b) an immiscible liquid, wherein: (i) each of the droplets comprises multiple molecules of the compound(s) contained therein; and the droplets do not contain monomeric precursors for the polymeric compound.

Also described herein is a method of making an emulsion, comprising: (a) obtaining an array of polymeric compounds on the surface of a substrate, wherein the polymeric compounds are bound to the substrate via a cleavable linker and wherein the areas that contain the polymeric compounds on the surface of the substrate are hydrophilic relative to the remainder of the surface of the substrate; (b) selectively hydrating the areas that contain the polymeric compounds to produce discrete droplets on the surface of the substrate, wherein each droplet contains a single polymeric compound or a pre-defined combination of polymeric compounds that are adjacent to one another on the substrate; and (c) releasing the polymeric compounds from the surface of the substrate by cleaving the cleavable linker, either before, during or after the hydrating step (b). Certain embodiments optionally include (d) collecting the droplets in an immiscible liquid, thereby producing an emulsion containing discrete droplets that each contain, in the solution phase, a single polymeric compound or a combination of polymeric compounds from features that are adjacent to one another on the substrate or from the same feature.

Droplets released from the surface have the potential to be used in conventional channel-based microfluidic systems in any of numerous assays where a multitude of synthetic polymeric compounds are useful. These include barcoded multiplex sequencing, haplotype sequencing, single-cell sequencing, high-throughput screening and gene assembly or gene synthesis. (Refs: Linas Mazutis et al., "Single-cell analysis and sorting using droplet-based Microfluidics" *Nature Protocols*, 8, 5, 870-891 (2013). Eric Brouzes, et al. "Droplet microfluidic technology for single-cell high-throughput screening", *PNAS*, 106, 34, 14195-14200 (2009), Haosheng Chen et al. "Reactions in double emulsions by flow-controlled coalescence of encapsulated drops", *Royal Society of Chemistry* (2011) DOI:10.1039/c11c20265k, Gaurav J. Shah et al., "EWOD-driven droplet microfluidic device integrated with optoelectronic tweezers as an automated platform for cellular isolation and analysis", *Lab Chip*, 9, 1732-1739 (2009)).

BRIEF DESCRIPTION OF THE FIGURES

The skilled artisan will understand that the drawings, described below, are for illustration purposes only. The drawings are not intended to limit the scope of the present teachings in any way.

DEFINITIONS

Figure 1:
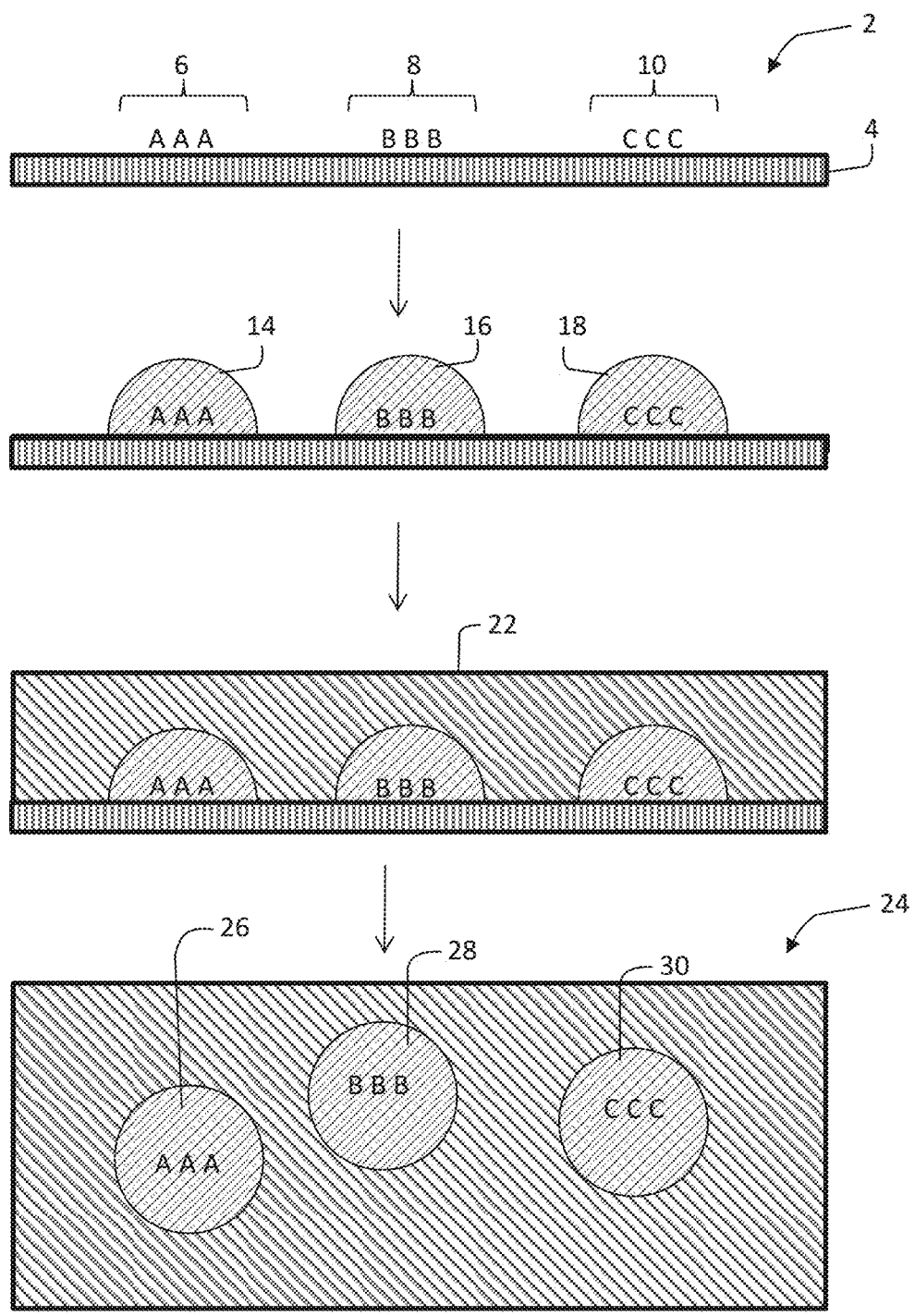
FIG. 1 schematically illustrates some of the general principles of one embodiment of the subject method.

Before describing exemplary embodiments in greater detail, the following definitions are set forth to illustrate and define the meaning and scope of the terms used in the description.

Numeric ranges are inclusive of the numbers defining the range. Unless otherwise indicated, nucleic acids are written left to right in 5' to 3' orientation; amino acid sequences are written left to right in amino to carboxy orientation, respectively.

Unless defined otherwise, all technical and scientific terms used herein have the same meaning as commonly understood by one of ordinary skill in the art to which this invention belongs. Singleton, et al., DICTIONARY OF MICROBIOLOGY AND MOLECULAR BIOLOGY, 2D ED., John Wiley and Sons, New York (1994), and Hale &

Markham, THE HARPER COLLINS DICTIONARY OF BIOLOGY, Harper Perennial, N.Y. (1991) provide one of skill with the general meaning of many of the terms used herein. Still, certain terms are defined below for the sake of clarity and ease of reference.

It must be noted that as used herein and in the appended claims, the singular forms "a", "an", and "the" include plural referents unless the context clearly dictates otherwise. For example, the term "a primer" refers to one or more primers, i.e., a single primer and multiple primers. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation.

As used herein, the term "array of polymeric compounds" is intended to a two-dimensional arrangement of addressable regions bearing particular polymeric moieties (e.g., biopolymers such as oligonucleotides or polypeptides, carbohydrates, and lipids as well as organic polymeric compounds that have been synthesized using monomers) associated with that region. In some embodiments, an array is an array of polymeric binding agents, where the polymeric binding agents may be any of: peptides, oligonucleotides, polysaccharides, synthetic mimetics of such biopolymeric binding agents, etc. The oligonucleotides of an array may be covalently attached to substrate at any point along the nucleic acid chain, but are generally attached at one terminus (e.g. the 3' or 5' terminus). Sometimes, the arrays are arrays of polypeptides, e.g., proteins or fragments thereof.

Any given substrate may carry one, two, four or more arrays disposed on a front surface of the substrate. Depending upon the use, any or all of the arrays may be the same or different from one another and each may contain multiple spots or features. An array may contain at least 10, at least 100, at least 1,000, at least 10,000, at least 100,000, or at least $10^6$ or more features, in an area of less than 20 cm$^2$, e.g., in an area of less than 10 cm$^2$, of less than 5 cm$^2$, or of less than 1 cm$^2$. In some embodiments, features may have widths (that is, diameter, for a round spot) in the range from 1 μm to 1.0 cm, although features outside of these dimensions are envisioned. In some embodiments, a feature may have a width in the range of 3.0 μm to 200 μm, e.g., 5.0 μm to 100 μm or 10 μm to 50 μm. Interfeature areas will typically be present which do not carry any polymeric compound. It will be appreciated though, that the interfeature areas, when present, could be of various sizes and configurations.

Each array may cover an area of less than 100 cm$^2$, e.g., less than 50 cm$^2$, less than 10 cm$^2$ or less than 1 cm$^2$. In some embodiments, the substrate carrying the one or more arrays will be shaped generally as a rectangular or square solid (although other shapes are possible), having a length of more than 4 mm and less than 10 cm, e.g., more than 5 mm and less than 5 cm, and a width of more than 4 mm and less than 10 cm, e.g., more than 5 mm and less than 5 cm.

Arrays can be fabricated using drop deposition from pulse jets of either polynucleotide precursor units (such as monomers) in the case of in situ fabrication, or the previously obtained polynucleotide. Such methods are described in detail in, for example, U.S. Pat. Nos. 6,242,266, 6,232,072, 6,180,351, 6,171,797, 6,323,043, U.S. patent application Ser. No. 09/302,898 filed Apr. 30, 1999 by Caren et al., and the references cited therein. These references are incorporated herein by reference. Other drop deposition methods can be used for fabrication, as previously described herein. Also, instead of drop deposition methods, photolithographic array fabrication methods may be used. Interfeature areas need not be present particularly when the arrays are made by photolithographic methods.

An array is "addressable" when it has multiple regions of different moieties (e.g., different polynucleotide sequences) such that a region (i.e., a "feature", "spot" or "area" of the array) is at a particular predetermined location (i.e., an "address") on the array. Array features are typically, but need not be, separated by intervening spaces.

The term "nucleotide" is intended to include those moieties that contain not only the known purine and pyrimidine bases, but also other heterocyclic bases that have been modified. Such modifications include methylated purines or pyrimidines, acylated purines or pyrimidines, alkylated riboses or other heterocycles. In addition, the term "nucleotide" includes those moieties that contain hapten or fluorescent labels and may contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are functionalized as ethers, amines, or the like.

The terms "nucleic acid" and "polynucleotide" are used interchangeably herein to describe a polymer of any length, e.g., greater than about 2 bases, greater than about 10 bases, greater than about 100 bases, greater than about 500 bases, greater than about 1000 bases, up to about 10,000 or more bases composed of nucleotides, e.g., deoxyribonucleotides or ribonucleotides, and may be produced enzymatically or synthetically (e.g., PNA as described in U.S. Pat. No. 5,948,902 and the references cited therein) which can hybridize with naturally occurring nucleic acids in a sequence specific manner analogous to that of two naturally occurring nucleic acids, e.g., can participate in Watson-Crick base pairing interactions. Naturally-occurring nucleotides include guanine, cytosine, adenine, thymine, uracil (G, C, A, T and U respectively). DNA and RNA have a deoxyribose and ribose sugar backbone, respectively, whereas PNA's backbone is composed of repeating N-(2-aminoethyl)-glycine units linked by peptide bonds. In PNA various purine and pyrimidine bases are linked to the backbone by methylene carbonyl bonds. A locked nucleic acid (LNA), often referred to as an inaccessible RNA, is a modified RNA nucleotide. The ribose moiety of an LNA nucleotide is modified with an extra bridge connecting the 2' oxygen and 4' carbon. The bridge "locks" the ribose in the 3'-endo (North) conformation, which is often found in the A-form duplexes. LNA nucleotides can be mixed with DNA or RNA residues in the oligonucleotide whenever desired. The term "unstructured nucleic acid", or "UNA", is a nucleic acid containing non-natural nucleotides that bind to each other with reduced stability. For example, an unstructured nucleic acid may contain a G' residue and a C' residue, where these residues correspond to non-naturally occurring forms, i.e., analogs, of G and C that base pair with each other with reduced stability, but retain an ability to base pair with naturally occurring C and G residues, respectively. Unstructured nucleic acid is described in US20050233340, which is incorporated by reference herein for disclosure of UNA.

The term "oligonucleotide" as used herein denotes a single-stranded multimer of nucleotides of from about 2 to 200 nucleotides, up to 500 nucleotides in length. Oligonucleotides may be synthetic or may be made enzymatically, and, in some embodiments, are 30 to 150 nucleotides in length. Oligonucleotides may contain ribonucleotide monomers (i.e., may be oligoribonucleotides) and/or deoxyribonucleotide monomers. An oligonucleotide may be 10 to 20, 21 to 30, 31 to 40, 41 to 50, 51-60, 61 to 70, 71 to 80, 80 to 100, 100 to 150 or 150 to 200 nucleotides in length, for example.

The term "primer" as used herein refers to an oligonucleotide, whether occurring naturally as in a purified restriction digest or produced synthetically, which is capable of acting as a point of initiation of synthesis when placed under conditions in which synthesis of a primer extension product, which is complementary to a nucleic acid strand, is induced, i.e., in the presence of nucleotides and an inducing agent such as a DNA polymerase and at a suitable temperature and pH. The primer may be either single-stranded or double-stranded and must be sufficiently long to prime the synthesis of the desired extension product in the presence of the inducing agent. The exact length of the primer will depend upon many factors, including temperature, source of primer and use of the method. For example, for diagnostic applications, depending on the complexity of the target sequence, the oligonucleotide primer typically contains 15-25 or more nucleotides, although it may contain fewer nucleotides. The primers herein are selected to be substantially complementary to different strands of a particular target DNA sequence. This means that the primers must be sufficiently complementary to hybridize with their respective strands. Therefore, the primer sequence need not reflect the exact sequence of the template. For example, a non-complementary nucleotide fragment may be attached to the 5' end of the primer, with the remainder of the primer sequence being complementary to the strand. Alternatively, non-complementary bases or longer sequences can be interspersed into the primer, provided that the primer sequence has sufficient complementarity with the sequence of the strand to hybridize therewith and thereby form the template for the synthesis of the extension product.

As used herein, the term "peptide" is intended to refer to a polymer of amino acids or analogs thereof.

As used herein, the term "organic molecules that have been made by combinatorial chemistry" is intended to refer to an organic polymer that is made using smaller building blocks that are joined to one another to produce a polymer. Such molecules may have a molecular weight of less then 1000 Da, e.g., less then 500 Da, depending on the number of monomers.

An array of polymeric compounds can be made using any suitable method, including methods in which pre-made polymeric compounds are deposited onto the surface of a substrate and then linked to the substrate, and also in situ synthesis methods.

As used herein, the term "synthesizing the polymeric compounds in situ" is intended to refer to methods by which a polymeric compound is grown in place on a substrate using monomeric precursors that are added one by one to a growing chain. Such methods include photolithographic methods, as well as drop deposition methods. Examples of such methods are described in, e.g., Cleary et al. (Nature Methods 2004 1: 241-248) and LeProust et al. (Nucleic Acids Research 2010 38: 2522-2540).

As used herein, the term "bound to the substrate via a cleavable linker" is intended to refer to an arrangement in which a polymeric compound is linked to a substrate via a cleavable bond. A cleavable bond may be cleaved using base (e.g., ammonia or trimethylamine), acid, fluoride or photons, for example.

As used herein, the term "areas that contain the polymeric compounds on the surface of the substrate" is intended to refer to the features that contain the polymeric compounds, as discussed above.

As used herein, the term "remainder of the surface of the substrate" is intended to refer to the areas of the surface of the substrate that do not contain the polymeric compounds (i.e., the areas of the surface of the substrate that lie between the areas that contain the compounds.

As used herein, the terms "hydrophobic" and "hydrophilic" are relative terms and are intended to refer to the degree by which a solution is attracted to or repelled from a surface. Hydrophobicity and hydrophilicity may be measured by measuring the contact angle of the solution on the surface, as described in Johnson et al. (J. Phys. Chem. 1964 Contact Angle Hysteresis 68: 1744-1750). Contact angle is a measure of static hydrophobicity, and contact angle hysteresis and slide angle are dynamic measures. See also the paper entitled Contact Angle Measurements Using the Drop Shape Method by Roger P. Woodward, which can be obtained at the website formed by placing "http://www." in front of "firsttenangstroms.com/pdfdocs/CAPaper.pdf".

As used herein, the term "selectively hydrating" is intended to refer to a step in which an aqueous solution is selectively applied to the areas of an array that contain the polymeric compounds (or selected groups thereof that are immediately adjacent to one another), but not the areas in between those areas. This step results in a substrate that has an array of droplets on its surface, where the edges of the droplets correspond to the boundaries of the features that contain the polymeric compounds.

As used herein, the term "discrete droplets" is intended to refer to droplets on the surface of the substrate that are separated from one another. As will be described below, each discrete droplet may occupy a single area (i.e., where each droplet lies over a single polymeric compound) or each discrete droplet may occupy multiple areas (where the droplets are actively induced to bleed into each other in a pre-defined way so that one droplet can contain multiple polymers).

As used herein, the term "each droplet contains a single compound" is intended to refer to a droplet that contains multiple molecules of the same substantially pure compound.

As used herein, the term "pre-defined" is intended to refer to something that is known prior to being made.

As used herein, the term "a pre-defined combination of polymeric compounds that are adjacent to one another on the substrate" is intended to refer to a combination of polymeric compounds that are adjacent to one another on the surface of a substrate, where the combination was planned beforehand. For example, and as will be explained in greater detail below, a pre-defined combination of polymeric compounds that are adjacent to one another on the substrate can be made by causing target droplets that are adjacent droplets to bleed into each other.

As used herein, the term "releasing the polymeric compounds from the surface" is intended to refer to a step in which the polymeric compounds are cleaved from the substrate surface. This step is done by cleaving a cleavable linker that links the polymeric compounds to the surface of the array.

As used herein, the term "collecting the droplets in an immiscible liquid" is intended to refer to a step in which droplets that are on the surface of a substrate are physically separated from the substrate to become droplets in an immiscible liquid, i.e., an emulsion.

As used herein, the term "emulsion" is intended to refer to a mixture of two or more liquids that are normally immiscible, in which one liquid forms droplets that are dispersed within another liquid. A water-in-oil emulsion refers to an emulsion that contains aqueous droplets and an organic (oily or hydrophobic) continuous phase. Depending on the liquids used, the droplets of an emulsion may be in the range of 100 nm to 100 µm, e.g., 1 µm to 50 µm.

As used herein, the term "droplet" is intended to refer to the aqueous part of an emulsion that is interspersed in a continuous liquid that is immiscible with water (i.e., the immiscible liquid).

As used herein, the term "immiscible liquid" is intended to refer to a continuous part of an emulsion.

As used herein, the term "in the solution phase" is intended to refer to a polymeric compound that is in an aqueous environment that is not bound or tethered to a solid substrate. Such a polymeric compound may be dissolved in the aqueous environment.

As used herein, the term "adjacent to one another on the substrate" is intended to refer to areas that contain polymeric compounds that are immediately adjacent to one another (i.e., next to each other, without any other areas that contain polymeric compounds that are in between).

As used herein, the term "mixture" is intended to refer to a solution in which the components are interspersed with one another and not spatially separated.

As used herein, the term "aqueous" is intended to refer to a medium in which the solvent is water.

As used herein, the term "a plurality of molecules of the compound(s)" is intended to refer to a composition that contains multiple molecules of the same compound. For example, a solution containing at least 100 molecules of a compound(s) contains at least 100 molecules of the same compound. More specifically, if a droplet contains at least 100 molecules of a particular oligonucleotide, then it contains at least 100 molecules of the same oligonucleotide.

A "plurality" contains at least 2 members. In certain cases, a plurality may have at least 10, at least 100, at least 1,000, at least 10,000, at least 100,000, at least $10^6$, at least $10^7$, at least $10^8$ or at least $10^9$ or more members.

As used herein, the term "monomeric precursors for the polymeric compound" is intended to refer to the free (i.e., unpolymerized) chemical building blocks from which a polymeric compound can be synthesized, either enzymatically or using solid-phase chemical synthesis methods. The identity of monomeric precursors for a polymeric compound may vary depending on the polymeric compound, e.g., whether the polymeric compound is an oligonucleotide, a peptide or an organic molecule, as well as the chemistry by which the monomers can be joined together. In some cases, monomeric precursors for the polymeric compound may be protected monomers. Monomeric precursors of oligonucleotides include phosphoramidites (which can be used in solid-phase synthesis of oligonucleotides) and nucleoside triphosphates (which can be used in enzymatic synthesis of oligonucleotides). Monomeric precursors of peptides include N-protected amino acids.

Other definitions of terms may appear throughout the specification.

DESCRIPTION OF EXEMPLARY EMBODIMENTS

Before the various embodiments are described, it is to be understood that the teachings of this disclosure are not limited to the particular embodiments described, and as such can, of course, vary. It is also to be understood that the terminology used herein is for the purpose of describing particular embodiments only, and is not intended to be limiting, since the scope of the present teachings will be limited only by the appended claims.

The section headings used herein are for organizational purposes only and are not to be construed as limiting the subject matter described in any way. While the present teachings are described in conjunction with various embodiments, it is not intended that the present teachings be limited to such embodiments. On the contrary, the present teachings encompass various alternatives, modifications, and equivalents, as will be appreciated by those of skill in the art.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

The citation of any publication is for its disclosure prior to the filing date and should not be construed as an admission that the present claims are not entitled to antedate such publication by virtue of prior invention. Further, the dates of publication provided can be different from the actual publication dates which can be independently confirmed.

As will be apparent to those of skill in the art upon reading this disclosure, each of the individual embodiments described and illustrated herein has discrete components and features which can be readily separated from or combined with the features of any of the other several embodiments without departing from the scope or spirit of the present teachings. Any recited method can be carried out in the order of events recited or in any other order which is logically possible.

All patents and publications, including all sequences disclosed within such patents and publications, referred to herein are expressly incorporated by reference.

Methods

Some features of the method are illustrated in FIG. 1. With reference to FIG. 1, some embodiments of the method comprise obtaining array 2 of polymeric compounds. As shown, the polymeric compounds A, B and C are bound to areas 6, 8 and 10 on the surface of substrate 4 via a cleavable linker, where area 6 contains multiple molecules of polymeric compound A, area 8 contains multiple molecules of polymeric compound B and area 8 contains multiple molecules of polymeric compound C. The presence of the polymeric compounds on the surface of the substrate makes those areas hydrophilic relative to the remainder of the surface of the substrate, which allows those areas to be selectively hydrated to produce discrete droplets 14, 16 and 18 on the surface of the substrate, wherein each droplet contains either a single polymeric compound or a combination of polymeric compounds that are adjacent to one another on the substrate. As shown, where droplet 14 contains multiple molecules of polymeric compound A, droplet 16 contains multiple molecules of polymeric compound B and droplet 18 contains multiple molecules of polymeric compound C.

After droplets have formed on the substrate, an immiscible liquid 22 is added to the substrate, and the droplets are collected in the immiscible liquid, thereby producing an emulsion 24 containing discrete droplets 26, 28 and 30, each of which containing, in the solution phase, a single polymeric compound or a combination of polymeric compounds that are adjacent to one another on the substrate. As shown, where droplet 26 contains multiple molecules of polymeric compound A in solution, droplet 28 contains multiple molecules of polymeric compound B in solution and droplet 30 contains multiple molecules of polymeric compound C in solution.

As would be apparent, the method also involves releasing the polymeric compounds from the surface of the substrate by cleaving the cleavable linker during the method. This can be done either before, during or after the hydrating step. For example, in some embodiments, the polymeric compounds can be released from the surface prior to hydration, e.g., by ammonia gas. In other embodiments, the polymeric compounds can be released from the surface during or after hydration but before addition of the immiscible liquid, e.g., using a reagent dissolved in the rehydrant or using light, depending on the cleavable linker used. In other embodiments, the polymeric compounds can be released from the surface after addition of the immiscible liquid, e.g., by adding a reagent to the immiscible liquid that transfers into the droplets.

In some embodiments, the polymeric compounds may be synthetically made oligonucleotides, peptides or organic molecules that have been made by combinatorial chemistry methods for the synthesis of which are well known (see, e.g., Cleary et al., Nature Methods 2004 1: 241-248, LeProust et al., Nucleic Acids Research 2010 38: 2522-2540, Panse et al., Molecular diversity 2004 8: 291-9, Lin et al., Journal of Allergy and Clinical Immunology 2009 124: 315-22, Uttamchandani et al., Mol Biosyst. 2006 2: 58-68 and Ma et al., Drug Discov Today 2006 11: 661-8, for example). In some embodiments, the method may comprise synthesizing the polymeric compounds in situ on the surface of the substrate.

The polymeric compounds on the array may be at a density of at least 1000 molecules per $\mu m^2$, e.g., at least 1000 molecules per $\mu m^2$, at least 5000 molecules per $\mu m^2$, at least 10,000 molecules per $\mu m^2$, at least 20,000 molecules per $\mu m^2$, at least 50,000 molecules per $\mu m^2$, up to 100,000 molecules per $\mu m^2$ or more. In certain embodiments, the areas that contain the polymeric compounds should be substantially more hydrophilic than the surrounding surface such that the surrounding surface confines the aqueous fluid to the feature for a practical volume of fluid (that could be at a contact angle as low as 20-30 degrees). In such cases the aqueous fluid will have a surface energy below the critical surface energy for wetting with respect to the interfeature surface. The difference in hydrophobicity between the areas that contain the polymeric compounds and the areas between the polymeric compounds may be controlled by controlling the density of the polymers, types of monomers used for synthesis, the lengths of the polymers, the linker chemistry and by selecting a substrate with suitable surface properties (or modifying a substrate so that it has suitable surface properties). In certain cases, the difference in contact angle between the areas that contain the polymeric compounds and the areas between the polymeric compounds is at least 10 degrees, at least 20 degrees, at least 30 degrees, at least 40 degrees, up to 50 degrees or more. As noted above and below, in certain cases the presence of the polymeric compounds on the surface of the substrate makes those areas more hydrophilic.

In some embodiments, the areas occupied by the polymeric compounds may be in the range of 1 $\mu m^2$ to 1 $mm^2$, e.g., 2 $\mu m^2$ to 200 $\mu m^2$ or 5 $\mu m^2$ to 100 $\mu m^2$, although areas outside of this range are envisioned. In any embodiment, there may be at least 1,000 areas (e.g., at least 5,000 areas, at least 10,000 areas, at least 50,000 areas, at least 100,000 areas, at least 500,000 areas or $10^6$ or more areas) that contain the polymeric compounds on the surface of the substrate. The distance by which the areas are separated from one another may vary greatly and, in some cases, they may be separated by a distance of at least 1 $\mu m$, e.g., a distance of at least 5 $\mu m$, a distance of at least 10 $\mu m$, or a distance of at least 20 $\mu m$, up to a distance of at least 50 $\mu m$ or more. In some cases, as described in greater detail below, some areas are designed to be very close to one another (e.g., less then 5 $\mu m$, less then 2 $\mu m$ or less than 1 $\mu m$) so that, upon hydration, the droplets bleed into one another to provide a droplet containing a pre-determined combination of polymers, where the polymeric compounds are adjacent to one another on the array.

The selectively hydrating can be done by any suitable method. In some embodiments, the selectively hydrating can be done by: placing the array in an environment having controlled humidity; b) printing a solution onto the areas that contain the compounds; c) subjecting the array to a freeze thaw cycle; or d) immersing the array in a solution and draining the solution from the areas that do not contain the compounds.

As noted above, at some point in the protocol, a cleavable bond that tethers the polymeric compounds is cleaved, thereby releasing the polymeric compounds from the surface of the support. A number of cleavable linkers may be used, including cleavable linkers that are cleavable using a base (e.g., ammonia, methylamine, ethanolamine, ethylenediamine or trimethylamine), acid, fluoride or photons, for example. Base-cleavable linkages include esters, particularly succinates (cleavable by, for example, ammonia or trimethylamine), quaternary ammonium salts (cleavable by, for example, diisopropylamine) and urethanes (cleavable by aqueous sodium hydroxide); acid-cleavable sites such as benzyl alcohol derivatives (cleavable using trifluoroacetic acid), teicoplanin aglycone (cleavable by trifluoroacetic acid followed by base), acetals and thioacetals (also cleavable by trifluoroacetic acid), thioethers (cleavable, for example, by HF or cresol) and sulfonyls (cleavable by trifluoromethane sulfonic acid, trifluoroacetic acid, thioanisole, or the like); nucleophile-cleavable sites such as phthalamide (cleavable by substituted hydrazines), esters (cleavable by, for example, aluminum trichloride), and Weinreb amide (cleavable by lithium aluminum hydride); and other types of chemically cleavable sites, including phosphorothioate (cleavable by silver or mercuric ions) and diisopropyl-dialkoxysilyl (cleavable by fluoride ions). Other cleavable bonds will be apparent to those skilled in the art or are described in the pertinent literature and texts (e.g., Brown (1997) Contemporary Organic Synthesis 4(3); 216-237). In particular embodiments, a photocleavable linker (e.g., a UV-cleavable linker) may be employed. Suitable photocleavable linkers for use may include ortho-nitrobenzyl-based linkers, phenacyl linkers, alkoxybenzoin linkers, chromium arene complex linkers, NpSSMpact linkers and pivaloylglycol linkers, as described in Guillier et al. (Chem Rev. 2000 Jun. 14; 100(6):2091-158). In some cases, the cleavage may release the polymeric compound and leave behind one or more hydrophobic residues, thereby increasing the hydrophobicity of the areas containing the polymers. In other cases, the cleavage may release the polymeric compound and leave behind one or more hydrophilic residues, thereby leaving the hydrophobicity of the areas containing the polymeric compounds relatively unchanged.

In some cases, the releasing step is done before the selectively hydrating step. In these embodiments, the selectively hydrating may be done by exposing the array to ammonia gas, thereby cleaving an ammonia-sensitive linkage that attaches the polymeric compounds to the substrate. In other embodiments, the selectively hydrating may be done by exposing the array to a light, thereby cleaving a photocleavable linkage that attaches the polymeric compounds to the substrate.

In other cases, the releasing step may be done during or after the selectively hydrating step. In these embodiments, the releasing step may be done by printing a solution that contains a cleavage agent onto the areas that contain the compounds, thereby cleaving a cleavage agent-sensitive linkage that attaches the polymeric compounds to the substrate. Alternatively, the releasing step may be done by exposing the array to a light, wherein the light cleaves a photocleavable linkage that attaches the polymeric compounds to the substrate.

In alternative embodiments, the releasing step (c) may be done by immersing the array in an immiscible agent that contains a cleavage agent (e.g., ammonium), thereby cleaving a cleavage agent-sensitive linkage that attaches the polymeric compounds to the substrate, or, alternatively exposing the array to light while it is in the immiscible liquid. In these embodiments, the polymeric compounds should be designed such that cleavage leaves behind a hydrophobic residue that is tethered to the surface of the array, thereby increasing the hydrophobicity of the surface of the array and allowing the droplets to be released with ease.

The immiscible liquid can comprise a mineral oil such as Petroleum Special, an alkane such as heptadecane, a halogenated alkane such as bromohexadecane, carbonated oils, perfluorocarbon oil, e.g. 3M's Novek™ HFE-7500, an alkylarene, a halogenated alkylarene, an ether, or an ester having a boiling temperature above 100° C., for example. The immiscible liquid should be insoluble or slightly soluble in water. In certain cases, the emulsion may or may not contain added surfactants that have hydrophilic-lipophilic-balances (HLB) values equal to or less than, e.g., 5.0. Those who are skilled in the art can appreciate that the surfactant affinity difference (SAD) of an oil phase can be adjusted by using various surfactants with various HLB values such that a stable inverse (water-in-oil) emulsion can be prepared. For example, fluorinated carrier oils drastically fluorosurfactants (surfactants with fluorinated tails) reduce the solubility of non-fluorinated compounds and are effective for forming emulsions with long shelf lives.

Collection of the droplets from the substrate may be done using any convenient method. In some embodiments and as illustrated in FIG. 1, the collecting may be done by applying an immiscible liquid to the surface of the array; and separating the droplets from the surface of the substrate, in the immiscible liquid. In certain embodiments, the aqueous fluid that has been used to hydrate the areas containing the polymeric compounds has a contact angle greater than the critical angle for wetting the interfeature surface, the immiscible fluid has a contact angle below the critical angle for wetting the interfeature surface, and the intrafeature surface is more hydrophilic than interfeature surface. Any difference in a contact angle may be at least 5 degrees, at least 10 degrees, at least 20 degrees, at least 30 degrees, at least 40 degrees or at least 50 degrees or more. The immiscible liquid should be chosen so that the droplets are stable therein and ideally, the surface will be sufficiently oleophilic that the carrier fluid will be beyond its critical surface energy for wetting the surface.

In these embodiments, the droplets may be separated from the substrate using any suitable method. In some embodiments, and as will be described in greater below, the droplets may be separated from the substrate by: a) moving a hydrophobic blade across the surface of the substrate, i.e., gently scraping the droplets off the surface of the substrate using a blade; b) displacing the droplets laterally by applying a liquid shear force, e.g., by gently wiggling the array from side to side; c) displacing the droplets by centrifugation; d) causing the droplets to expand, e.g., using heat or negative pressure; e) cleaving the oligonucleotides, leaving behind a hydrophobic monomer, thereby causing the areas to become more hydrophobic; f) firing a shaped acoustic or ultrasonic wave or pulse at the droplets; or g) aspirating the droplets from the surface using an aspirator that has a set of channels aligned with the droplets. Depending on the density of the droplets relative to the immiscible liquid, the droplets may rise or fall into the substrate.

Emulsion Compositions

Also provided is an emulsion comprising: droplets that contain a single polymeric compound or a pre-defined mixture thereof (where the polymeric compounds in the pre-defined mixture were adjacent to one another on the array), and an immiscible liquid. In these embodiments, each of the droplets comprises a plurality of molecules, e.g., at least 100 molecules, at least 500 molecules, at least 1,000 molecules, at least 5,000 molecules, at least 10,000 molecules, at least 50,000 molecules, at least 100,000 or at least $10^6$ molecules of the compound(s) contained therein. Specifically, if a droplet contains a single polymer, then there will be, e.g., at least 100 molecules of the same polymeric compound in the droplet. Likewise, if a droplet contains multiple polymers, then there will be, e.g., at least 100 molecules of each of the polymeric compounds in the droplet. In addition, the droplets do not contain monomeric precursors for the polymeric compound, meaning that the polymeric compounds are not made in the droplet but rather made before the droplet if formed. For example, if the droplets contain oligonucleotides, then the droplets do not contain nucleotide triphosphates (or any other type of triphosphate precursor) that can be used by a polymerase to manufacture the oligonucleotide. In certain cases, the droplets are also free of other entities, e.g., other primers, enzymes (e.g., polymerase), cofactors and reagents required for synthesis of the polymeric compounds contained therein.

Droplets can be kept isolated in an emulsion for months at a time without substantial droplet coalescence by any suitable method. Ways for stabilizing water and oil emulsions are described in a variety of publications, including Shim et al. (J. Am. Chem. Soc. 2009 42: 15251-15256). Leunissen et al. (PNAS 2007 104: 2585-2590) and Holtze et al. (Lab Chip 2008 8: 1632-1639).

Depending on how the emulsion is made, in certain embodiments, at least 10% of the droplets (e.g., at least 20% of the droplets, at least 30% of the droplets, at least 40% of the droplets or at least 50% or more of the droplets) each contains a single polymeric compound (i.e., multiple molecules of the same compound) and each of those droplets contains a different single polymeric compound.

In some embodiments, at least 10% of the droplets (e.g., at least 20% of the droplets, at least 30% of the droplets, at least 40% of the droplets or at least 50% or more of the droplets) each contains a pre-defined mixture of polymeric compounds (i.e., multiple molecules of each of the polymeric compounds contained therein) and each of those droplets contains different pre-defined mixtures of polymeric compounds.

In some embodiments, the emulsion may comprise at least 10,000 droplets (at least 50,000 droplets, at least 100,000 droplets, at least 500,000 droplets, or at least $10^6$ or more droplets) each containing a different polymeric compound or pre-defined combination thereof. In some embodiments, the emulsion may have a volume of in the range of 10 µl to 10 ml or more, e.g., 50 µl to 5 ml, e.g., 100 µA to 2 ml, as desired.

In certain embodiments, the polymeric compounds in the droplets may be single-stranded oligonucleotides. In some embodiments the oligonucleotides may be partially complementary to one another and can hybridize and be ligated to one another to produce a synthon. Such an emulsion may be useful in gene synthesis methods. In some embodiments, the single stranded oligonucleotides may be primers that, for example, hybridize to a target genome. Such an emulsion may be useful in genomics methods, e.g., to sequence a genome.

Further details on some embodiments are described below. The methods and compositions described in general above are exemplified below using an oligonucleotide array. As would be recognized, the principles described below can be applied to other arrays.

Provided herein is a process for the creation of a high-complexity emulsion in which a large number of distinct combinations of nucleic acids or other polymeric molecules are combined into very small distinct fluidic compartments. This resulting emulsion can be used in high-throughput screening applications in which many reagents, cells, small molecules, etc. are tested or processed in parallel. The approach can also be applied to gene synthesis, where multiple shorter DNA oligonucleotides, are combined to make longer DNA constructs, where the components of each longer construct are partitioned into individual compartments. Many of these combinations, up to hundreds of thousands, of millions of compounds, can be constructed simultaneously in a single emulsion from a single slide or wafer, where a wafer may be diced into multiple slides.

This disclosure presents a new approach to creating an ordered 2-dimensional surface-bound water-in-oil emulsion, and then removing the droplets that comprise the emulsion from the surface to create a bulk or liquid-phase emulsion, or to create an emulsion captured within a cartridge in small channels, such as microchannels. This approach enables the confinement of multiple reagents either synthesized or deposited on an array or substrate to be combined and compartmentalized in a single droplet to form a complex emulsion, and in a multiplex approach where each combined droplet contains one or more reagents in combination. Each droplet can contain a distinct set of constituent chemical moieties, with such potential complexity that in some applications no two droplets contain the same combination of chemical moieties.

The method allows a great expansion of the scale of compartmentalization of independent sets of sequences or chemistries from the hundreds with existing microwell-plate technologies to hundreds of thousands, or even millions, using microarray technologies. The approach entails the generation of a large number of sets of oligonucleotides (or other chemistries), the independent encapsulation of each of those sets, and the co-encapsulation of each set in an assay with an independent sample. In this way, each chemical set can be combined with a distinct sample of a large set of independent samples.

The primary challenge for applying complex oligonucleotide library synthesis to large-scale chemical processes is the independent isolation and manipulation of large numbers of chemical mixtures without the use of complex and expensive robotic pipetting systems. This problem is solved by the encapsulation of chemical sets within microdroplets that use the surface energy between two disparate media to isolate mixtures or samples (along with the appropriate surfactants). These media are selected to have disparate hydrophilic or oleophilic properties, e.g. oil and water. Such micro-droplets and emulsions have been described in numerous papers and used in numerous applications, including digital-PCR and targeted enrichment for sequencing by companies, for example, RainDance Technologies, Life Technologies, and BioRad.

For the sample barcoding application, two sets of droplets can be combined, where one set of droplets has a series of independent barcodes and another set of droplets contains independently compartmentalized samples or whole cells. These two independent sets of droplets are combined or "fused" one droplet pair at a time in rapid succession at rates as high as several thousand droplets per second using methods known to those skilled in the art of droplet fusion.

Methods for Droplet Recovery

Oligonucleotide arrays can be synthesized on a glass substrate. After synthesis, the substrate has hydrophobicities that are quite different inside feature regions than outside feature regions. In several standard oligonucleotide production processes, the float glass substrate is made hydrophobic by a silanization process before synthesis of the features. The hydrophobicity of the surface is measured by the contact angle, which is the inside angle between the tangent of the outer surface of a droplet on a uniform surface and the plane of the surface upon which it rests. For a test probe consisting of a water droplet, greater hydrophobicity means a higher contact angle. In one current process, the contact angle for a water drop on the blank substrate is approximately 110 degrees, which is moderately hydrophobic and the contact angle is 65-90 degrees for propylene carbonate, a polar aprotic solvent. After synthesis, the features' footprints become more hydrophilic. The contact angle for a surface that is coated in oligonucleotides is much lower than this, e.g., in the range of 9-12 degrees, indicating that a DNA coated surface is highly hydrophilic. (See, e.g., Ladik et al. Nanoscape 2010 7(1):19-23).

The hydrophobicity of the substrate can be controlled and optimized by chemists skilled in the art using methods involving spin coating or vapor deposition. For this application, the substrate should be more hydrophobic than the features containing nucleic acids, and it should be of comparable hydrophobicity to the oil. The substrate may even be spatially patterned with regions of disparate hydrophobicity before oligonucleotide synthesis for certain applications.

A surface may be made hydrophobic by making it non-polar. This can be accomplished by shielding polar groups, such as hydroxyls, at the surface by bonding of organosilanes. The Agilent substrate surface is silanized using a chemistry proprietary to Agilent. However, the hydrophobicity of the substrate can be increased even further using known hydrophobic coatings and chemistries. These may include: methyl-substituted alkylsilanes and fluorinated alkylsilanes, titanium dioxide, or other non-polar chemistries. There is also a class of superhydrophobic coatings that have even higher hydrophobicities, including: manganese oxide polystyrene (MnO2/PS), nano-composite zinc oxide polystyrene (ZnO/PS), nano-composite precipitated calcium carbonate, carbon nanotube structures and silica nano-coating. With chemistries such as these, the substrate can be made oleophilic (and hydrophobic) to wet with the oil that is used as the transport media for the water droplets. Certain embodiments may benefit by use of a super-hydrophobic surface.

One step in the synthesis process is the cleavage of the oligonucleotides from the surface of the substrate. This can be accomplished by means of a cleavable linker (see, e.g., LeProust et al., supra). The cleavable linker could alternatively be a photocleavable linker, one that is cleavable by light, typically in the UV wavelength range: 300-350 nm. Cleavable linkers are known to those skilled in the art of DNA chemistry, and some are commercially available today. One commonly used cleavable linker is cleaved by exposing the substrate to ammonia gas ($NH_3$), typically for 30 minutes, to decouple the oligonucleotide from the substrate. This is followed by a longer exposure to ammonia gas to complete the decoupling of the linker from the synthesized oligonucleotides. For normal oligonucleotide synthesis, after the exposure to the ammonia gas, the oligonucleotides are removed by flooding the substrate with an aqueous solution, which mixes up all the oligonucleotides from the slide into a single pool.

For this application, the oligonucleotides are removed from the surface on a feature-by-feature or droplet-by-droplet basis, keeping each set of molecules isolated from the neighboring sets.

Condensation

In certain embodiments, aqueous droplets are formed by condensation on the surface of an array of nucleotide features. In these embodiments, the array is enclosed in an environmentally-controlled chamber, where the temperatures of the surfaces and humidity of gases introduced are precisely controlled. An array of oligonucleotides on the array surface provides regions that are hydrophilic. Water vapor is introduced into the sealed chamber containing the slides which then condenses preferentially on the hydrophilic features where the oligonucleotides reside. By controlling the humidity, temperature and pressure of the chamber as well as independently controlling the temperature of the substrate itself, the formation of condensation can be precisely controlled. The hydrophilic oligonucleotide features provide nucleation sites for the formation of water droplets. This process can be monitored and controlled by an automated vision system. The formation of undesirable parasitic droplets that are not localized to the features can be reduced by several possible improvements. These improvements may include the integration of a resistive coating or electrodes onto the surface of the substrate in order to preferentially heat the surface area between the features, or the integration of a pattern of thermally conductive columns or wells into the underside of the substrate that cool the features relative to the regions surrounding them. In another approach the slide is cooled to a point where the water is allowed to freeze on the surface. This approach has been found to reduce the formation of parasitic droplets between features.

In some embodiments, oligonucleotides are cleaved from the surface before condensation occurs, leaving shorter oligonucleotides covalently bound to the surface to maintain its hydrophilic character, and in other embodiments cleavable linkers, such as photocleavable linkers, are used to liberate the oligos from the surface after droplet formation, in some cases, changing its hydrophilicity.

Figure 2:
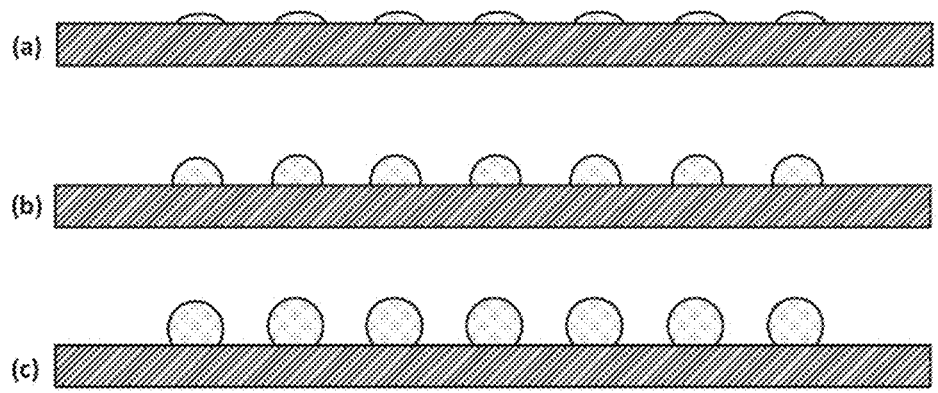
FIG. 2 schematically illustrates growth of water droplets by condensation of water vapor on top of DNA features, at three sequential time points, a, b and c.

FIG. 2 illustrates water vapor condensing on the surface of DNA features on a glass substrate. Since the features are hydrophilic the water initially spreads itself thinly across each of the features' surfaces. Once the water droplet spans the area of a feature, further condensation adds to the height of that feature without increasing its contact area, due to the hydrophobic surface surrounding each feature. The volume of the droplet is limited by the contact angle and surface tension that can be supported by the surface of the substrate at the boundary of the feature. Since the cleaved oligonucleotides should stay on the surface near or within the feature in which they were synthesized, the water droplet should be capable of absorbing the bulk of the cleaved oligonucleotides.

Figure 3:
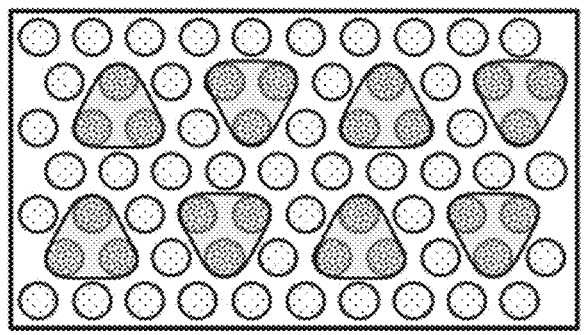
FIG. 3 schematically illustrates a few simple feature patterns for creating large droplets formed from the coalescence of clusters of smaller droplets residing on multiple adjacent features. The coalescence occurs by firing multiple ink-jet droplets onto the features until the droplets expand sufficiently to come into contact with neighboring droplets and thus expand each composite droplet.
Figure 3:
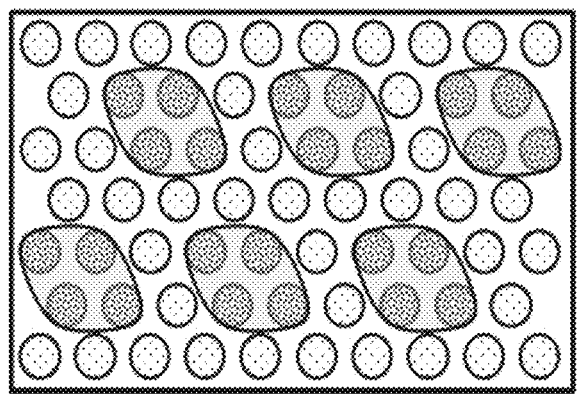
Figure 3:
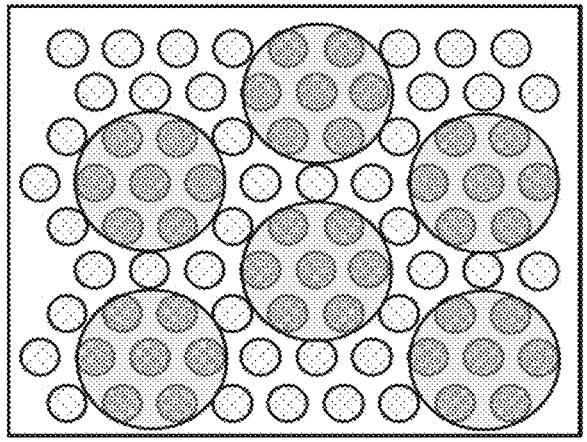

If a small number or a cluster of features are placed in close proximity to each other, while others are further away those small clusters can coalesce when their surfaces come into contact. This can be a desirable mechanism for combining small groups of distinct features, for example to combine different oligonucleotides in the same droplet. In this embodiment, the spatial separation of small clusters of features is substantially smaller than the spatial separations between groups or clusters of features. This can be accomplished using a regular grid of features by leaving some features blank (i.e. no oligonucleotide synthesis). For example, certain rows, columns or diagonal lines of features can be left blank. Or, more complex patterns of features with distinct oligonucleotides can be created, e.g. triangular clusters of 3, 6, 10 or more features, rhomboidal or square patterns or rectangular patterns of 4, 9, 16 or more features, or honeycomb patterns (with a central feature) or 7, 19, 37 . . . or more features (given by the formula: $1+6n(n-1)/2$), or less symmetrical patterns may also be equivalently useful. In this way, the higher the number of features per droplet, the lower the number of droplets generated. In this way, feature pools can be used to create the simple feature patterns, a few of which are represented in FIG. 3.

To maintain the hydrophilicity of the surface of the oligonucleotide feature after the cleavage of the oligonucleotides that comprise the feature, the cleavable linker may be positioned several bases from the start position of the oligonucleotide synthesis, thus leaving behind a bed of short oligonucleotide sequences on the surface of substrate (or another hydrophobic monomer) in the footprint of each feature. Each of these short oligonucleotide sequences can act as part of a hydrophilic bed of molecules that serves to act as a nucleation site for the condensation of a liquid drop. These spacer sequences may be comprised of homopolymers of the nucleotide that has the best relevant properties, which may include synthesis yield and hydrophilicity. This hydrophilic element of the oligonucleotide is not necessarily a natural base. It can be any chemical group or modification that can be coupled to the oligonucleotide that is sufficiently hydrophilic. In this approach, the hydrophilicity of the feature (after the oligonucleotide cleavage) may be controlled by changing the number of bases (of chemical groups) synthesized before the linker and oligonucleotide, depending on the surface chemistry between oligonucleotides.

Inkjet-Droplet Generation

An alternative to the condensation method is to use an inkjet to deposit a droplet of aqueous solution directly onto each oligonucleotide feature. The inkjet can rapidly fire droplets in precise patterns and cover the whole slide or wafer with droplets within minutes or even seconds. This droplet generation machinery is not as complex as an oligonucleotide writer, since all features get the same reagent and there is no immersion step. One complexity of this device is that the humidity will likely need to be controlled so that the droplets maintain their original sizes, without significant evaporation throughout the deposition process and until the next step. It may also be efficient to integrate this machine with an ammonia chamber for cleavage, to minimize wafer handling after cleavage.

This approach provides the freedom to introduce additional reagents to the droplets, before encapsulation. For example, if one wants to eliminate the ammonia-based cleavage, another cleavable linker can be used, one that utilizes a reagent included in the ink-jetted solution. Also, salts or buffers can be included in the ink-jetted solution. Further, the volume of liquid that can be deposited onto a specific site can be controlled either through the design of the head or by multiple firings per site. This means that droplets can more easily be made larger than features and encompass multiple features. This multi-feature capability enables those droplets to have multiple different sequences, each with a different purpose. For example, the features can be partially complementary so that they will form double-stranded duplexes, making them amenable to ligation to the double-stranded target DNA. Or, some features could serve as primers and others as barcodes.

For this multi-feature droplet embodiment, the features should be arranged in clusters in such a way that the droplets will combine with other droplets arranged in clusters, so that only the features intended for a cluster will be joined by an oversized droplet for that cluster. Empty space will prevent droplets from combining with unintended clusters of features. For example, the droplets could be placed in triangular triplets (given a nominal interleaved feature pattern) where three features are impinged upon by a single droplet and that droplet is separated from all other triplets by at least one empty feature row, column or line of features. Larger droplets may be easier to manipulate and encapsulate than smaller ones. This method allows the use of multi-feature clusters, and those droplets can have more feature redundancy in the oligonucleotide composition, or in controlling ratiometric combinations of different oligonucleotides.

Generation of Droplets on Array by Aqueous Flooding

An array of spatially arranged droplets can be generated on an array by flooding a substrate with oligonucleotides with aqueous reagent and eluting the reagent, leaving aqueous reagent behind on the hydrophilic regions where the oligonucleoutides reside. The oligonucleotides can subsequently be cleaved from the surface using chemically or photocleavable linkers, as described further below. The same patterns can be achieved by dipping the slide into aqueous reagents. The lifespan of the droplets is critically dependent on the sizes of the droplets (both volume and area) as well as temperature and humidity of their environment. They can last from seconds to indefinitely. Typically, droplets formed in this by elution of a reagent are flat relative to their diameter due to the dynamics of the surface tension of the meniscus. The droplet volumes can be controlled and enhanced after formation by controlling the humidity and temperature of the environment. In this way, smaller droplets can be made larger by cooling the substrate and/or adding water vapor or cooling to condense vapor. Several parameters affect the volumes of the droplets as they form on the surface, the feature size of the hydrophobic region being the strongest factor, but other factors are involved as well, and these can be used to optimize the droplet volume during formation. These additional factors include, the surface tension of the aqueous media, the chemical composition, such as the ionic concentrations or polarities of the molecules in the media, the viscosity of the media, and the speed of the meniscus as it moves past the features. The chemical composition of the medium has a strong effect on a number of these parameters. Useful agents for modifying these parameters of reagents include, but are not limited to: water, glycerol, PEG (polyethylene glucol), salts, and surfactants.

Figure 8:
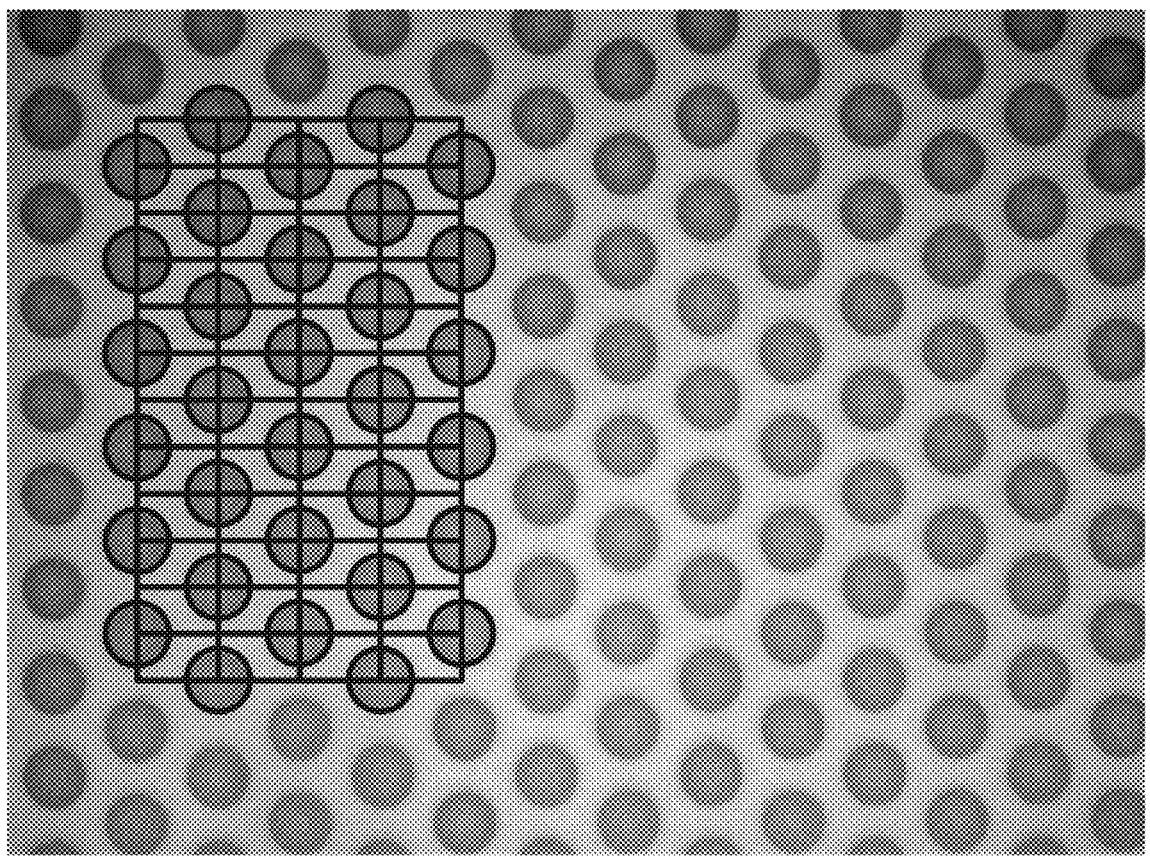
FIG. 8 shows an image of aqueous droplets (40% PEG) in air on a DNA array. The circles and lines overlaid on the image indicate the nominal size and spacing of DNA features as synthesized on the array. This figure shows that the droplet sizes are about the same as the chemical feature sizes.
Figure 9:
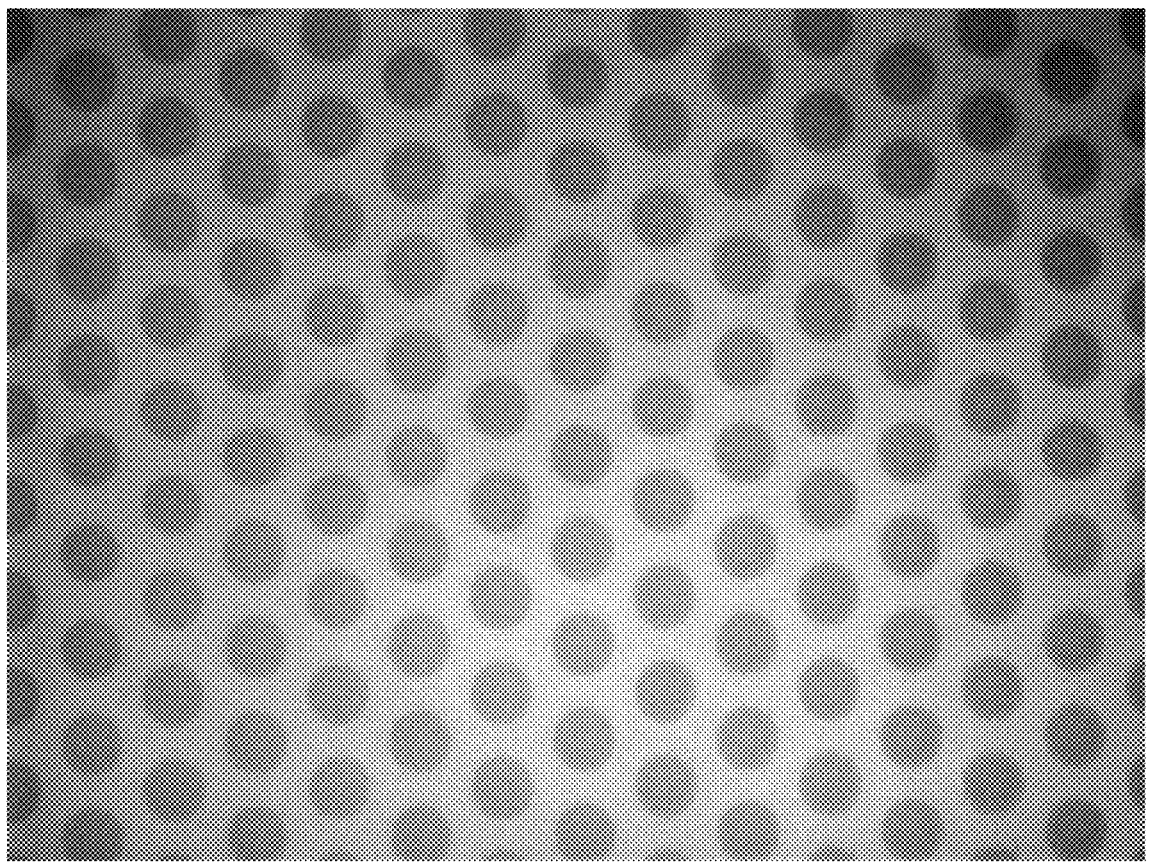
FIG. 9 shows an image of aqueous droplets (40% PEG) in oil on a DNA array. The droplets are encapsulated on an array in Novec-7500 Engineering fluid (The 3M Company, St. Paul, Minn.).

An example of droplets on a surface that were produced by flooding and draining a slide with aqueous solution is shown in FIGS. 8 (showing droplets in air on an array surface) and 9 (showing droplets in oil on an array surface).

Droplets can also be stabilized after formation on the surface of the array by controlling the humidity and temperature of the environment. Additionally, their properties can be changed. For example the sized of the droplets may be enhanced in size by the increasing the rate of condensation on the surface of the array. And, they may be stabilized by condensation of a volatile oil on the surface, even in the absence of complete emersion in the oil. Also, additional reagents or samples can be added in place on the array to enhance the properties of the droplets. For example other volatile reagents may be added to change the pH of the droplets. Or additional droplets, for example containing samples or reagents, may be fired on top of the droplets, and thus merge with the droplets on the surface.

Some applications of the polymer-laden emulsion can utilize the two-dimensional emulsion in situ on the original slide or wafer. These applications may benefit by maintaining the knowledge of which droplet contains which polymeric compound or compounds. This enables the DNA-barcoding of samples, cells or cellular content such as its polynucleotides (RNA or DNA) that are created or stored on the surface by hybridization. Knowledge of which barcode (or barcodes) resided at which site allows the association of this information to be recorded and utilized with other properties of the sample combined with the droplet at the same site, for example phenotypic information related to the sample or cells combined at specific locations on the array in downstream data analysis. Numerous applications are enabled by the removal of the droplets from the surface of the substrate. In the case of droplet removal and the formation of an emulsion separable from the source array, a multitude of conventional microfluidic approaches can be utilize to take advantage of these high-complexity emulsions. This rich set of microfluidic tools, sometimes called, "microfluidic logic", includes capabilities for the merging or fusion of droplets, of droplets with beads, sorting of droplets, changing the aqueous media surrounding the droplets, forming double emulsions, and ultimate the breaking of the emulsion to perform bulk operations on it's labeled or barcoded constituents.

Numerous applications require various reagents in addition to the nucleotides attached to the surface before encapsulation of the droplets within oils. These reagents include, but are not limited to sample nucleic acids, primers, enzymes, cofactors for enzymes and salts. For embodiments that enhance the droplet volumes by condensation these reagent need be flooded onto the array at concentrations greater than required for the compartmentalized reactions, so that their final enhanced volumes are within the range of requisite final concentrations. In the cases of larger reactant molecules, such as enzymes, these can be conjugated with short nucleic acids that hybridize to the nucleic acids on the surface and hold the reactants on the surface at numbers consistent with their requisite concentrations.

Oleo-Flooding of Droplets

Figure 4:
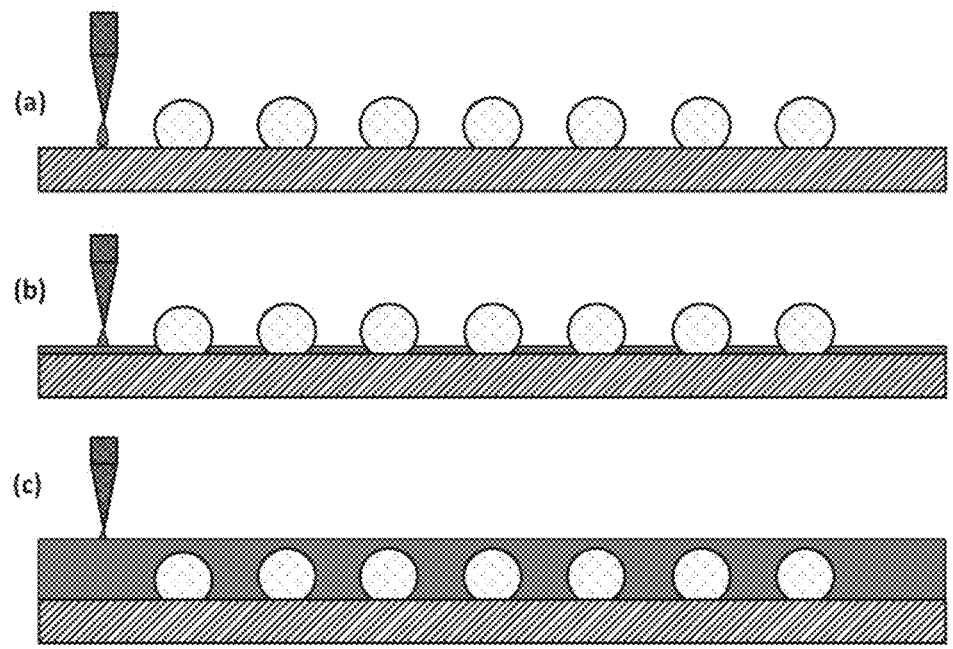
FIG. 4 schematically illustrates immersion of droplets in oily fluid. Once the aqueous droplets are formed, an oily fluid is flowed onto the substrate surrounding the features, and eventually immersing them to form encapsulated droplets, or an emulsion on a surface.

After formation of the water droplets, an oily liquid (i.e., a non-aqueous liquid that is not miscible with water and can be used as a biphasic medium to carry water droplets as an emulsion) may be applied to the surface to encapsulate the aqueous droplets. As the surface has been prepared to be oleophilic, the oily liquid will readily spread thinly across or "wet" the surface. This is depicted in FIG. 4, in three stages. A pipet tip is shown depositing an oily isolation fluid onto the substrate. The wetting of the whole surface may benefit by the use of multiple tips distributed across the surface, or by moving the tip or tips across the substrate. The substrate may also be tilted to enhance fluid flow across the slide housed within a chamber. Alternatively, the chamber could be flooded through an open orifice into the chamber. Alternatively, it could also be spin coated, but at a speed that is low enough that the water droplets are not displaced by the centripetal force. In our preliminary experiments, we have experimentally found the droplets to be surprisingly robust with regard to flooding with oil.

Removal of Oligonucleotide Droplets from the Surface

There are numerous methods for removal of the oligonucleotide droplets from the surface. These include: scraping, lateral displacement by liquid shear force, displacement by centrifugation, droplet expansion, photocleavage, chemical cleavage, acoustic waves and aspiration. Each of these is discussed in more detail below.

Physical Scraping by a Squeegee:

Conceptually, the simplest method of removing the droplets from the surface involves the use of a micro-squeegee containing a hydrophobic material in the shape of a blade, for example a razor blade with a hydrophobic coating, that runs or scrapes along the surface freeing the droplets as it moves across the substrate at an oblique angle. The complexity here is mainly in the construction of a mechanical system the keeps the droplets immersed in liquid while a squeegee is drawn across its surface, without appreciable loss of droplets. In some embodiments, surfactants are used to prevent droplets from coalescing when they are forced into contact with each other.

Lateral Displacement:

The amount of physical force required to remove the droplet from the surface depends on the difference in the surface energy of the oil/water interface and the surface energy at the interface between the droplet and the surface below the droplet (the feature footprint). The force applied may also be related to the surface energy at the interface between the droplet and the surface between features. For simplicity, we will assume that the surface of the slide is comparable in hydrophobicity to the oil itself. In practice, this method may require a specific surface coating.

If the surface energy at the droplet/feature interface is relatively low, a simple swirling motion, or stirring of the fluid may be sufficient to remove the droplets from the surface. If it is substantially higher, then a greater physical force may be required.

Figure 5:
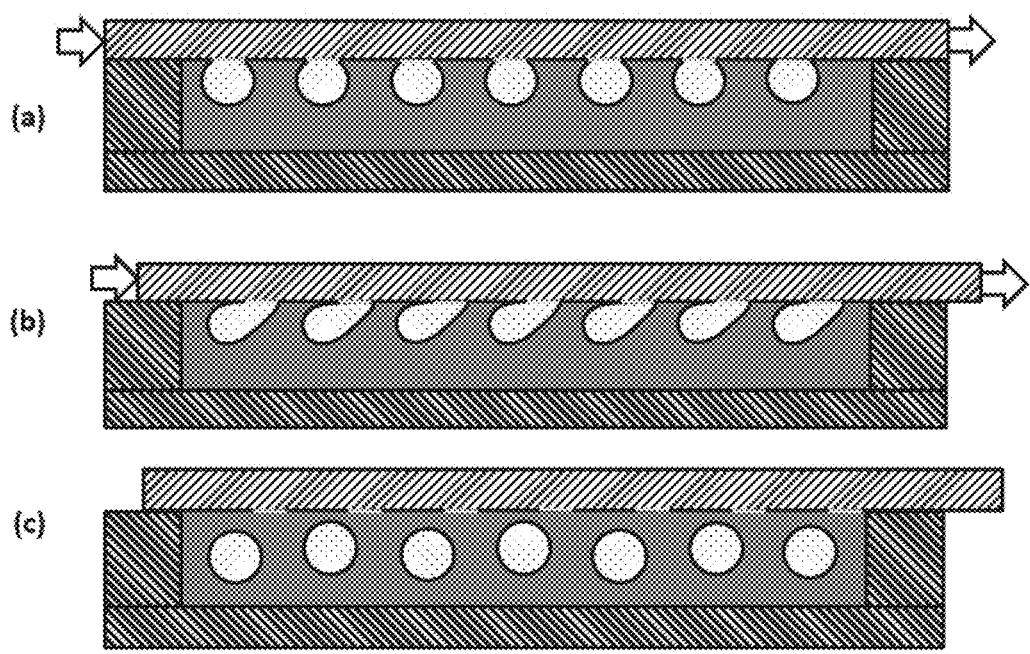
FIG. 5 schematically illustrates removal of the droplets from the surface of the slide by lateral shear force.

This force can be applied by filling the chamber with oil, to minimize fluid motion, such as sloshing and surface waves, and translating the substrate laterally with respect to the fluid (or vice versa), as depicted in FIG. 5. This should be accomplished by an abrupt or sudden impulse. A sudden lateral displacement of the substrate will create a shear force by pulling the droplet through the oily fluid that surrounds it. The force will be proportional to the size of the droplet and the viscosity of the fluid. This displacement can be accomplished by an actuator, such as an electric motor, solenoid, or piezoelectric transducer, or any element that translates the substrate, or by a sudden impulse on the substrate delivered by a damped hammer mechanism, FIG. 5(a). The inertia of the fluid should keep the droplet spatially localized while the substrate shifts below it, FIG. 5(b), away from the footprint region of high surface energy (hydrophilic) to an interstitial region of low surface energy (hydrophobic). Since the interstitial regions will already be "wetted" with oil, the droplet will become completely surrounded with oil, and hence be freed from the substrate, FIG. 5(c). Care should be taken to only provide the shear force necessary to reliably free the droplets from the surface but not so great a force as to fragment the droplets or fuse them together.

A similar but slightly different embodiment is to oscillate the fluid or the substrate at a frequency which will essentially shake the droplets free. Another embodiment is to use fluid motion to blow the droplets off the features, analogous to the way wind from a fan is used to blow water off a surface.

Centrifugation:

A force normal or lateral to the surface, or anywhere in between, can be generated by centrifugation. In this approach, the force on the droplet is proportional to the difference in the densities of the two fluids, and the volume of the droplet. Centrifuges are common laboratory equipment and many slides can be processed at once making the process low cost and efficient. With this approach it is necessary to achieve a balance in providing sufficient force to free the droplets, while keeping the acceleration low enough to minimize or prevent droplet coalescence.

One means of avoiding droplet coalescence due to the forces applied by the centrifuge is to have a high density well-plate opposed to each slide in such a way that when each droplet pops off the slide it falls into one of the wells. As long as each droplet falls into only a single well, and each well contains no more than a single droplet, fusion is avoided. These wells are to be constructed with highly hydrophobic surfaces so that the droplets readily come out of the wells after the spinning is stopped. The complexities here relate to the large number of wells necessary in the well plate, and possibly achieving the registration between the well plate and the slide that may be necessary. These high-density well-plates should be reusable.

Droplet Expansion:

In this approach, the droplets are caused to expand by evaporation or boiling. There are two approaches that can be used either individually or together. One method involves heating the aqueous droplet and the other is to pull a partial vacuum on the chamber containing the substrate with a layer of oil. In the first approach, the droplets are heated by means of a mechanism that preferentially heats the water without excessively heating the oil and in the second approach a partial vacuum can be applied to a chamber containing the emulsion. In either approach a small fraction of the aqueous fluids in each droplet is vaporized, expanding the size of the droplet, so that its buoyancy is ultimately sufficient to overcome the surface energy holding it to the surface. Once the droplet is freed from the surface, it rises up within the oil and it can be cooled and condensed by keeping the oil above the surface relatively cool. The upper region of the chamber may be cooled to facilitate the necessary thermal gradient.

Two fast mechanisms of heat-transfer that can be used are a microwave generator (or Klystron) tuned to a water absorption frequency (as used in a microwave oven) and infrared lasers, again tuned to a water absorbance band. One potential downside of these methods is that if neighboring droplets expand, they may be forced into contact while the droplet expands and could cause droplets to coalesce. This could limit the density of features on the slide and hence the number of droplets that can be produced. This can be avoided by using a laser heating mechanism, if it is used to spatially address the droplets without heating neighboring droplets. Such a laser beam could be steered by galvanometers, diffractive elements, rotating minors or DLPs, but such an approach adds a high degree of complexity to the system. The droplets could also be heated briefly by pulsing the energy source. In another approach, an optical beam, such as from a laser source, that impinges on the droplets from below the surface at an angle past Brewster's angle thus heating only the bottom micron of the droplet.

Photocleavage:

A photocleavable linker can be used to attach the oligonucleotide to the surface and the surface is treated to make it hydrophobic before oligonucleotide synthesis, the cleavage of the oligonucleotides could reverse the hydrophilic property of the features with DNA, returning it to a more hydrophobic state once the DNA oligonucleotides are decoupled from the surface. If this chemical conversion process can be made sufficiently efficient, then the droplet no longer has affinity for the feature footprint, allowing the droplet to be released into the oily fluid surrounding it. To make this cleavage occur, the features can either be spatially addressed optically, by a laser for example, or it can be exposed to light by flood or directed illumination, e.g. by an LED, a UV lamp or UV laser. The illumination of the surface may be broadly across the whole surface, or the light may be spatially focused or projected in a pattern onto the surface by means of a lens, such as a microscope objective depending on which features need be cleaved. Ultimately, the polarity of the cleaved surface will depend on the properties of the chemical group or polymer that remains on the surface after cleavage of the linker, and whether or not that group can be blocked, quenched or reacted with by addition of a chemical reagent. If the chemistry produces a sufficiently hydrophilic surface, then the features can be wetted, forming droplets, simply by flooding or dipping the whole slide in an aqueous solution.

Similarly, once the droplets have been formed on the surface and isolated in oil, the photochemical cleavage of a hydrophilic group can be manipulated and used to free the droplets from the surface by changing the hydrophobicity or oleophilicity of the surface of the substrate through photocleavage. In this case the surface of the feature starts hydrophilic to form the droplets and is made hydrophobic by the removal of a hydrophilic, or charged, group, leaving a more hydrophobic (or uncharged) residue.

Chemical Cleavage:

A chemically cleavable linker is also an effective way to remove the droplets from the surface. In one embodiment the chemical reagent (such as ammonia) can be applied to cleave the linker by incorporation in the aqueous solution deposited onto the aqueous solution. In this embodiment, the droplets will become less securely attached to the surface as the chemical reaction moves forward. This embodiment entails a linker that leaves behind a hydrophobic residue on the surface. At some point the droplets can be removed by anything from a slight agitation to more aggressive approaches, as described above.

In another embodiment, the chemical agent that cleaves the linker is carried by or dissolved in the oily medium in which the aqueous droplets are immersed. In this case, since the feature is protected by the aqueous droplet, it may be useful to agitate or vibrate the substrate during the cleavage step so as to accelerate the reaction rate between the cleavable linkers and the cleaving agent. Again, once the hydrophilic surface is replaced with a hydrophobic surface, the droplets will simply detach from the surface when a sufficient fraction of the linkers are cleaved.

Hybridization or a Hydrophobic Group:

In this approach a hydrophobic group is attached to an oligonucleotide sequence that is added to either the aqueous sample or carrier oil. This oligonucleotide sequence is complementary to the sequence remaining on the surface after cleavage of the oligonucleotides into the droplets. The oligos will aggregate at the interface between the droplets and the oil with their hydrophilic parts in the aqueous droplets and their hydrophobic heads in the oil. These will diffuse to the surface hybridizing with the oligos on the surface reducing the contact area between the droplets and the substrate, and making the droplets easier to remove.

Acoustic or Ultrasonic Waves:

The use of an acoustic transducer to fire a shaped acoustic or ultrasonic wave or pulse at the droplets may assist in their removal from the surface. This may work best by setting up a resonance oscillation of the droplets near one of their resonant frequencies. Oscillations induced by the wave could allow increasing oil intrusion between the droplet and the substrate, ultimately freeing it from the substrate.

Aspiration:

In another embodiment the droplets may be aspirated from the surface using a head with a set of channels aligned with the droplets. As the head moves across the slide, each channel within the head alternately encounters aqueous droplets and oil droplets. As it moves, the head aspirates whatever is in its path, forming alternating plugs of oil and aqueous droplets in the channel or tubing. When the aqueous plugs move to a wider channel or tubing the plugs will become spherical droplets, and form an emulsion.

Figure 6:
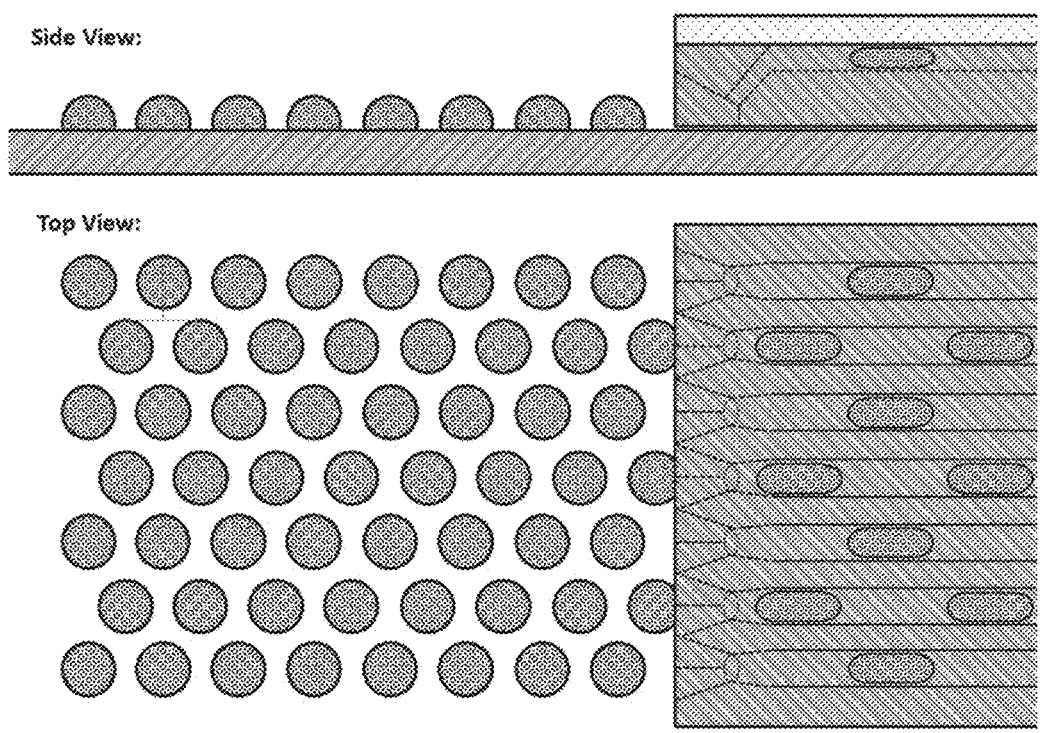
FIG. 6 schematically illustrates a multiplex aspirator for the removal of droplets from the substrate. As the head moves from the right to the left across the substrate it alternately aspirates the fluid sitting on the feature and the interstitial carrier fluid in which the array is immersed. This causes the generation of alternate plugs of chemically-laden aqueous fluids (e.g. with DNA or RNA) and oil (or any carrier fluid) within the microchannels within the head. These channels can be plumbed into a chip which stores the droplets in the same order in which they were situated on the array. Or, it can pump them into a common chamber in which all droplets get randomized in a 2D or 3D emulsion.

This approach is depicted schematically in FIG. 6. In this depiction, the front of the aspiration head has a series of funnel-shaped regions that center the droplets on the middle of the channel. As shown a positive displacement type aspirator draws the droplets into the head along with the carrier fluid for the emulsion. Once in the head, the droplets flow into small microchannels. This approach has the advantage that it keeps the droplets into the microchannels in their original order (as printed on the array). This conservation of ordering may be useful for some applications.

Optical Tweezers:

In another embodiment, optical tweezers can be used to remove droplets from the surface of a slide. Optical tweezers is an approach that can be used to move or control microscopic dielectric objects, e.g. cells, within liquids using high-intensity Gaussian laser beams. Optical tweezers typically can apply greater forcers transverse to the beam axis than along it, but also produce a force due to photon pressure in the direction of propagation of the beam. So, there are two ways this approach could be used to remove a droplet from a surface. Using a transverse approach a droplet could be pulled from the more hydrophilic region of the chemical feature laterally to an adjacent region that is much more hydrophobic (or super-hydrophobic), where it would attain a lower energy by moving from the surface and into the carrier fluid. Alternatively, a force can be applied the direction of propagation by directing the beam from below the substrate into the fluid and either gently increasing the intensity or by moving the beam waist from the surface into the fluid above the surface, carrying a portion of the droplet along with it. Methods for generating optical tweezers are known to those skilled in the art (Ref: K. C. Neuman and S. M. Blocka, "Optical Trapping", *Rev. Sci. Instrum.* 75, NO. 9, (2004)).

Figure 7:
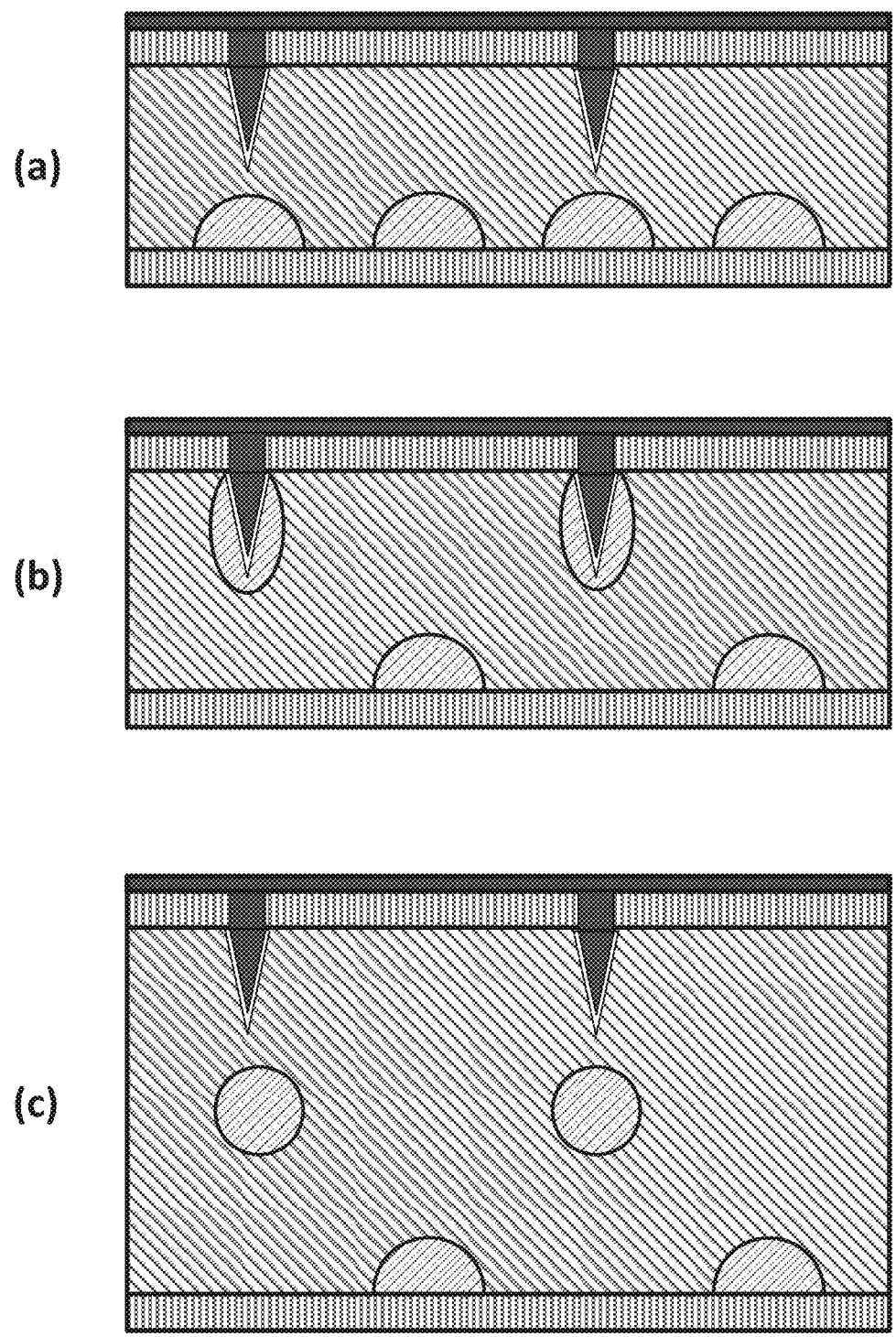
FIG. 7 schematically illustrates an electrowetting embodiment.

Electrowetting:

In yet another embodiment, the droplet can be removed from the original surface by attraction to a second surface by means of electro-wetting. In this embodiment, a second surface, nominally parallel to the first, is brought into close proximity with the first surface (on which the droplets are attached) and for each droplet (or a subset of droplets) there is a corresponding electrode that is charged to create an electric field gradient that attracts the dielectric aqueous droplet to this second surface and pulling the bulk of the droplet away from the first surface. The field can be pulsed on to attract the droplets, then the second surface is pulled away from the first surface and the field is nulled, releasing the droplets into the carrier fluid. To accomplish this, the second surface or electrodes protruding from it are shaped to form a strong field gradient, and coated with both an insulating layer and a super-hydrophobic coating. The surface or its electrodes can be shaped, for example into hemispheres, or the surface may be flat with electrode pins protruding from it and is depicted in FIG. 7. This latter design produces the greatest field gradient for a given applied voltage. In some embodiments, there are fewer pins than there are features to be removed, allowing greater field gradients to be produced without interference from neighboring electrodes. In these embodiments, subsets of the features are removed from the surface at a time, serially until all are removed.

Electrowetting has been employed to remove empty aqueous droplets within oil from a substrate with the help of direct contact with electrode wires (ref: J. Hong and S. J. Lee "Detaching droplets in immiscible fluids from a solid substrate with the help of electrowetting" *Royal Society of Chemistry*, (2014) DOI: 10.1039/c41c01049c).

In some embodiments, hydrogels or alginates are deposited onto the substrate or directly onto the features before immersion in a carrier fluid. In these embodiments, it may be useful to deposit alginates (or a hydrogel) onto the features by means of an inkjet, and subsequently deposit another droplet with a calcium solution to polymerize the alginate (or hydrogel) before the addition of a carrier fluid.

For some applications, it may be useful to barcode the droplets for downstream sorting or identification by a means other than the polymeric compound chemically synthesized on the array. This barcoding can be accomplished by depositing a supplementary barcoded droplet or barcoded bead onto each chemical droplet on the array before immersion within the applied oil. Typically this barcode is an optical barcode. These optical barcodes enable the isolation, sorting or combining of individual droplets after encapsulation and before the completion of the assay.

One application enabled by this disclosure is the ordered assembly of complex DNA structures, for example in the construction of DNA origami. It should be possible to enhance the complexity or increase the scale of the production of DNA structures by staging the construction. This process works by, first combining smaller components into intermediate subassemblies, followed by the combining of these subassemblies into larger, more complex structures. Barcoding droplets, each comprised of a small number of distinct DNA components, makes possible the combining of similarly or distinctly barcoded droplets (and their constituent components) in an orderly fashion, allowing more complex structures to be formed. It also enables an array of distinct components to be assembled into multiple distinct structures using a large common set of components.

Another potential application of optical barcodes is in the synthesis of genes, sets of genes to form pathways, or even more complex genomic mechanisms or subsystems of living organisms. In this application, each component, which may be an exon or a cassette of a gene, or a gene, or a genomic construct, can be independently barcoded, and, after the synthesis of all of the parts, isolated from the complex emulsion to form more complex assemblies using any combination of parts. Again, each of these can be sorted and combined in complex combinations.

The emulsion may be employed in a variety of applications, including haplotype or phased sequencing, single-cell sequencing, multiplex gene synthesis or gene assembly, and high-throughput screening. With the increase in scale enabled herein, each of these applications can achieve levels of multiplexing greater than ever before.

In applications involving high-throughput screening, each droplet may contain a distinct chemical moiety, which could be a small molecule, nucleic acid or cell with a unique genomic nucleic acid construct. In a high-throughput screen, these chemical moieties are under test to find a few that have the optimal characteristics. At the end of the test-phase, a few compartments are selected based on a phenotypic measurement or characteristic. This test requires that the original droplet be identified after its selection to determine the identity of the original elements or the conditions experienced by that particular element. In some cases the identity of each element can be determined after isolation of the best suited compartment by chemical analysis, e.g. by sequencing nucleic acids in the compartments. See, e.g., Xu et al. (*PNAS*, 2009 106(7): 2289-2294).

EMBODIMENTS

Aspects of the disclosure include an emulsion comprising: (a) droplets that each contain a single polymeric compound or a pre-defined mixture of polymeric compounds, and (b) an immiscible liquid, wherein: (i) each of the droplets comprises at least 100 molecules of the polymeric compound(s); and (ii) the droplets do not contain monomeric precursors for the polymeric compound(s) contained therein. In certain embodiments, at least 10% of the droplets contain a single polymeric compound, and each droplet contains a different polymeric compound from the other droplets in the 10% of droplets. In certain embodiments, at least 10% of the droplets contain a pre-defined mixture of polymeric compounds, and each droplet contains a different pre-defined mixture of polymeric compounds from the other droplets in the 10% of droplets. In certain embodiments, the emulsion comprises at least 10,000 droplets, each containing a different polymeric compound or pre-defined mixture of polymeric compounds. In certain embodiments, the polymeric compounds are single-stranded oligonucleotides. In certain embodiments, at least 10% of the droplets each contain a pre-defined mixture of single-stranded oligonucleotides, wherein the oligonucleotides are partially complementary to one another and can hybridize and be ligated to one another to produce a synthon. In certain embodiments, the single stranded oligonucleotides are primers.

Aspects of the disclosure include a method of making an emulsion, comprising: (a) obtaining an array of polymeric compounds on the surface of a substrate, wherein the polymeric compounds are bound to the substrate via a cleavable linker and wherein the areas that contain said polymeric compounds on the surface of the substrate are hydrophilic relative to the remainder of the surface of the substrate; (b) selectively hydrating the areas that contain said polymeric compounds to produce discrete droplets on the surface of the substrate, wherein each droplet contains a single polymeric compound or a pre-defined combination of polymeric compounds that are adjacent to one another on the substrate; and (c) releasing the polymeric compounds from the surface of the substrate by cleaving the cleavable linker, either before, during or after the hydrating step (b). In certain embodiments, the polymeric compounds are synthetically made oligonucleotides, peptides or organic molecules that have been made by combinatorial chemistry. In certain embodiments, step (a) comprises synthesizing the polymeric compounds in situ on the surface of the substrate. In certain embodiments, the polymeric compounds are at a density of at least 1000 molecules per $\mu m^2$. In certain embodiments, the areas are in the range of 1 $\mu m^2$ to 1 $mm^2$. In certain embodiments, there are at least 1,000 areas that contain said polymeric compounds on the surface of the substrate. In certain embodiments, the areas are separated from one another by a distance of at least 1 $\mu m$. In certain embodiments, the selectively hydrating is done by: a) placing the array in an environment having controlled humidity; b) printing a solution onto the areas that contain said polymeric compounds; c) subjecting the array to a freeze thaw cycle; or d) immersing the array in a solution and draining the solution from the areas that do not contain said compounds. In certain embodiments, the releasing step (c) is done before the selectively hydrating step (b). In certain embodiments, the releasing step (c) is done by: exposing said array to ammonia gas, thereby cleaving an ammonia-sensitive linkage that attaches the polymeric compounds to the substrate; or exposing said array to a light, thereby cleaving a photocleavable linkage that attaches the polymeric compounds to the substrate. In certain embodiments, the releasing step (c) is done during or after the selectively hydrating step (b). In certain embodiments, the releasing step (c) is done by printing a solution that contains a cleavage agent onto the areas that contain said compounds, thereby cleaving a cleavage agent-sensitive linkage that attaches the polymeric compounds to the substrate. In certain embodiments, releasing step (c) is done by exposing the array to a light, wherein the light cleaves a photocleavable linkage that attaches the polymeric compounds to the substrate. In certain embodiments, the releasing step (c) is done by immersing the array in an immiscible agent that contains a cleavage agent, thereby cleaving a cleavage agent-sensitive linkage that attaches the polymeric compounds to the substrate. In certain embodiments, the collecting is done by: applying an immiscible liquid to the surface of the array; and separating the droplets from the surface of the substrate, in the immiscible liquid. In certain embodiments, the separating is done by: a) moving a hydrophobic blade across the surface of the substrate; b) displacing the droplets laterally by applying a liquid shear force; c) displacing the droplets by centrifugation; d) causing the droplets to expand; e) cleaving the oligonucleotides, thereby causing the areas to become more hydrophobic; f) firing a shaped acoustic or ultrasonic wave or pulse at the droplets; g) moving the droplets away from the surface of the substrate using an electric field; h) displacing the droplets from the surface of the substrate using a force applied by optical tweezers; or i) aspirating the droplets from the surface using an aspirator that has a set of channels aligned with the droplets. In certain embodiments, the method further comprises: (d) collecting the droplets in an immiscible liquid, thereby producing an emulsion containing discrete droplets, each of which containing, in the solution phase, a single polymeric compound or a combination of polymeric compounds that are adjacent to one another on the substrate. In certain embodiments, the collecting is done by: applying an immiscible liquid to the surface of the array; and separating the droplets from the surface of the substrate, in the immiscible liquid.

What is claimed is:

1. A method of making an emulsion, comprising:
    (a) obtaining an array of polymeric compounds on the surface of a substrate, wherein the polymeric compounds are bound to the substrate via a cleavable linker and wherein the areas that contain said polymeric compounds on the surface of the substrate are hydrophilic relative to the remainder of the surface of the substrate;
    (b) selectively hydrating the areas that contain said polymeric compounds by flooding the substrate with an aqueous reagent and then removing the aqueous reagent from the substrate to leave discrete droplets of the aqueous reagent on the areas that contain said polymeric compounds, wherein each droplet contains a single polymeric compound or a pre-defined combination of polymeric compounds that are adjacent to one another on the substrate;
    (c) releasing the polymeric compounds from the surface of the substrate by cleaving the cleavable linker, either before, during or after the hydrating step (b);
    (d) collecting the droplets in an immiscible liquid, thereby producing an emulsion containing discrete droplets, each of which containing, in the solution phase, a single polymeric compound or a combination of polymeric compounds that are adjacent to one another on the substrate.

2. The method of claim 1, wherein the polymeric compounds are synthetically made oligonucleotides, peptides or organic molecules that have been made by combinatorial chemistry.

3. The method of claim 2, wherein step (a) comprises synthesizing the polymeric compounds in situ on the surface of the substrate.

4. The method of claim 1, wherein the polymeric compounds are at a density of at least 1000 molecules per $\mu m^2$.

5. The method of claim 1, wherein the areas are in the range of 1 $\mu m^2$ to 1 $mm^2$.

6. The method of claim 1, wherein the areas are separated from one another by a distance of at least 1 $\mu m$.

7. The method of claim 1, wherein the releasing step (c) is done before the selectively hydrating step (b).

8. The method of claim 7, wherein the releasing step (c) is done by:
    exposing said array to ammonia gas, thereby cleaving an ammonia-sensitive linkage that attaches the polymeric compounds to the substrate; or
    exposing said array to a light, thereby cleaving a photocleavable linkage that attaches the polymeric compounds to the substrate.

9. The method of claim 1, wherein the releasing step (c) is done during or after the selectively hydrating step (b).

10. The method of claim 9, wherein the releasing step (c) is done by printing a solution that contains a cleavage agent onto the areas that contain said compounds, thereby cleaving a cleavage agent-sensitive linkage that attaches the polymeric compounds to the substrate.

11. The method of claim 9, wherein releasing step (c) is done by exposing the array to a light, wherein the light cleaves a photocleavable linkage that attaches the polymeric compounds to the substrate.

12. A method of making an emulsion, comprising:
    (a) obtaining an array of polymeric compounds on the surface of a substrate, wherein the polymeric compounds are bound to the substrate via a cleavable linker and wherein the areas that contain said polymeric compounds on the surface of the substrate are hydrophilic relative to the remainder of the surface of the substrate;
    (b) selectively hydrating the areas that contain said polymeric compounds by flooding the substrate with an aqueous reagent and then removing the aqueous reagent from the substrate to leave discrete droplets of the aqueous reagent on the areas that contain said polymeric compounds, wherein each droplet contains a single polymeric compound or a pre-defined combination of polymeric compounds that are adjacent to one another on the substrate;
(c) releasing the polymeric compounds from the surface of the substrate by cleaving the cleavable linker, during or after the hydrating step (b);
wherein the releasing step (c) is done by immersing the array in an immiscible agent that contains a cleavage agent, thereby cleaving a cleavage agent-sensitive linkage that attaches the polymeric compounds to the substrate.

* * * * *